(12) United States Patent
Favresse et al.

(10) Patent No.: US 10,010,838 B2
(45) Date of Patent: Jul. 3, 2018

(54) DISPERSING RESINS

(71) Applicant: EVONIK DEGUSSA GmbH, Essen (DE)

(72) Inventors: Philippe Favresse, Ratingen (DE); Andre Broetzmann, Essen (DE); Anette Vogt, Essen (DE); Katrin Roland, Essen (DE); Thorsten Schierle, Essen (DE); Irina Maedche, Krefeld (DE); Christian Maus, Duisburg (DE)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 15/127,078

(22) PCT Filed: Mar. 4, 2015

(86) PCT No.: PCT/EP2015/054494
§ 371 (c)(1),
(2) Date: Sep. 19, 2016

(87) PCT Pub. No.: WO2015/144404
PCT Pub. Date: Oct. 1, 2015

(65) Prior Publication Data
US 2018/0028994 A1  Feb. 1, 2018

(30) Foreign Application Priority Data
Mar. 26, 2014 (DE) .................. 10 2014 205 680

(51) Int. Cl.
*C08G 63/02* (2006.01)
*B01F 17/00* (2006.01)
*C08G 63/91* (2006.01)
*C08G 63/47* (2006.01)

(52) U.S. Cl.
CPC ............ *B01F 17/005* (2013.01); *C08G 63/47* (2013.01); *C08G 63/912* (2013.01)

(58) Field of Classification Search
CPC ..................................................... B01F 17/005
USPC .................................................. 528/271, 272
See application file for complete search history.

(56) References Cited

U.S. PATENT DOCUMENTS

| | | |
|---|---|---|
| 183,815 A | 10/1876 | Osborn |
| 4,224,212 A | 9/1980 | Topham |
| 6,197,877 B1 | 3/2001 | Thetford et al. |
| 6,787,600 B1 | 9/2004 | Thetford et al. |
| 7,442,724 B2 | 10/2008 | Esselborn et al. |

FOREIGN PATENT DOCUMENTS

| | | |
|---|---|---|
| DE | 10 2006 059558 A1 | 6/2008 |
| EP | 1 685 895 A2 | 8/2006 |
| WO | 98-19784 A1 | 5/1998 |
| WO | 01-21298 A1 | 3/2001 |

OTHER PUBLICATIONS

International Search Report dated Jun. 12, 2015 in PCT/EP2015/054494 filed Mar. 4, 2015.
U.S. Appl. No. 13/058,372, filed Feb. 10, 2011, 2011/0144269, Dirk Kuppert, et al., Jun. 2011.
U.S. Appl. No. 13/205,834, filed Aug. 9, 2011, 2012/0037036, Thomas Veit, et al., Feb. 2012.
U.S. Appl. No. 14/628,991, filed Feb. 23, 2015, 2015/0240020, Thomas Veit, et al., Aug. 2015.

*Primary Examiner* — Terressa Boykin
(74) *Attorney, Agent, or Firm* — Grüneberg and Myers PLLC

(57) ABSTRACT

A dispersing resin of formula (I), T-P-Z-T (I). The dispersin resin of this formula is defined where T is at least one monocarboxylic acid, where Z includes at least one of a polyallylamine and a poly(C2-4-alkyleneimine), and where P is a polyester obtained by a process of reacting a dicarboxylic or a polycarboxylic acid and a diol or a polyol.

20 Claims, No Drawings

DISPERSING RESINS

The present invention relates to innovative dispersing resins, to their preparation and to their use for dispersing solids.

Solids (e.g. fillers, dyes or pigments) are generally dispersed in liquid media using dispersing resins in order to achieve effective stabilisation of the solids, to reduce the mechanical shearing forces needed, and hence to enable a very high degree of filling. Being surface-active materials, the dispersing resins wet and/or cover the surface of the particles to be dispersed, and stabilise them against unwanted reagglomeration. In the production of paints, varnishes, printing inks and other coating materials, therefore, dispersing resins facilitate the incorporation of solids, such as fillers and pigments, for example, which, as important formulating ingredients, substantially determine the visual appearance and the physicochemical properties of such systems. For optimum utilisation, these solids on the one hand must be distributed uniformly in the formulations, and on the other hand the distribution once achieved must be stabilised.

A multiplicity of different substances are nowadays used as dispersants for solids. Besides very simple compounds of low molecular mass, such as lecithin, fatty acids and their salts or alkylphenol ethoxylates, for example, more complex structures, of high molecular mass, are also used as dispersing resins. Here there are especially amino-functional and amido-functional systems which find broad use.

DE 2830860, WO 00/24503 and WO 01/21298 describe, for example, dispersing resins based on polyester-modified polyamines. EP 893155 describes polyamine salts and their use as dispersing resins for pigments and fillers. The polyesters are based on hydroxycarboxylic acids or lactones.

The use of dispersing resins may also lead to disadvantages, in view, for example, of the fact that high levels of dispersing additives are frequently needed for use in pigment pastes; the achievable levels of pigmentation of the pastes are unsatisfactorily low; the stability of the pastes and hence their consistency of viscosity are inadequate; the use of solvents cannot be avoided; or else flocculation and aggregation cannot always be prevented. Likewise there is often a lack of consistency of shade after storage of the pastes, and a lack of compatibility with diverse binders and pigments. With the use of dispersing additives known from the prior art, in many cases, there are also adverse effects on the water resistance or light stability of coating materials, or unwanted foam is produced when they are used. In many cases as well, as a result of lack of compatibility of the dispersing resins in commercially utilised coating media, the gloss is undesirably affected. Furthermore, the focus is being placed more and more on commercially available and inexpensive raw materials which, if possible, are even to be obtained from renewable sources.

There is therefore a growing demand for dispersing resins for solids that exhibit properties representing a further improvement on the prior art. A particular requirement in this context is for dispersing resins which have a very high stabilising effect on a large number of different solids.

It is an object of the present invention, therefore, to provide dispersing resins which exhibit improved performance properties and can be used advantageously, for example, for the dispersing of solids.

The aforementioned object is achieved by new dispersing resins according to the present invention.

A first subject of the present invention are therefore dispersing resins of the general formula (I), $$T-P-Z-T \qquad (I)$$

in which
T is a group which ends polymerization,
Z is a basic group or a radical which comprises a basic group,
P is a polyester based on dicarboxylic or polycarboxylic acids and diols or polyols, including salts of compounds of the formula (I).

Dispersing resins of the present invention display an effective dispersing performance, without adversely affecting the viscosity and the rheology of the corresponding formulations. With the resins of the present invention, accordingly, it is possible to reduce the amount of highly priced pigments used, without having to accept detractions from the colour strength. Moreover, the viscosity behaviour of pastes, paints, varnishes, printing inks and other coating materials which comprise dyes, solids, such as fillers and/or pigments, is substantially codetermined by the dispersing resin used. Here, the dispersing resins of the invention meet the usual requirement for a very low viscosity to be produced and also retained in the liquid paints and varnishes, with preference being given to a newtonian viscosity behaviour. The dispersing resins of the invention are based, furthermore, on inexpensive, commercially available raw materials. This is true in particular of the moiety P of the resins of the formula (I) of the invention, in which dicarboxylic acids and diols are used to form the polyesters, thereby making it possible to avoid the use of caprolactone, which, while known from the prior art, is costly and inconvenient. This use of inexpensive and commercially available raw materials, especially for the moiety P, permits a broader structural variation and security of supply in relation to the dispersing resins of the invention.

Part of the dispersing resins of the formula (I) of the invention are polyester units P based on dicarboxylic or polycarboxylic acids and on diols or polyols. The polyester units P in the dispersing resins of the formula (I) are generally carboxy-functional polyesters with possibly still free OH groups, some or all of which may be reacted in a subsequent reaction, with anhydrides, for example, to form carboxy-functional polyesters. The polyesters in question are, more particularly, OH-functional, preferably amorphous copolyesters which are linear or slightly branched and saturated or unsaturated.

Dicarboxylic or polycarboxylic acids in the sense of the present invention encompass the free acids, their anhydrides or esters of the stated dicarboxylic acids; in the case of esters, preference is given to low molecular mass esters, such as methyl or ethyl esters, for example.

Suitable dicarboxylic or polycarboxylic acids are, for example, phthalic acid, isophthalic acid, terephthalic acid, 1,2-cyclohexanedicarboxylic acid and isomers, succinic acid, sebacic acid, methyltetrahydrophthalic, methylhexahydrophthalic, hexahydrophthalic or tetrahydrophthalic acid, dodecanedioic acid, adipic acid, glutaric acid, citraconic, fumaric, itaconic, maleic or mesaconic acid, azelaic acid, pyromellitic acid and/or trimellitic acid, their acid anhydrides and/or low molecular mass alkyl esters such as methyl esters, for example.

Suitable diols or polyols are, in particular, ethylene glycol, 1,2- and/or 1,3-propanediol, diethylene, dipropylene, triethylene and tetraethylene glycol, 1,2- and/or 1,4-butanediol, 1,3-butylethylpropanediol, 1,3-methylpropanediol, 1,5-pentanediol, cyclohexanedimethanol, Dicidol, glycerol, 1,6-hexanediol, neopentyl glycol, bisphenol A, B, C, F, norbornylene glycol, 1,4-benzyldimethanol and -ethanol and/or 2,4-dimethyl-2-ethylhexane-1,3-diol.

The polyester units P comprise preferably 25 to 75 wt % of dicarboxylic or polycarboxylic acids and 25 to 75 wt % of diols or polyols, with the sum of the diols or polyols and the sum of the dicarboxylic or polycarboxylic acids making 100 wt %.

The preparation of polyesters is well known to the skilled person. They are prepared generally by condensation of dicarboxylic or polycarboxylic acids or their anhydrides with diols or polyols. Their properties depend largely on the nature and proportion of the starting materials.

In the context of the present invention, the polyester units are prepared by continuous or (semi-)batch esterification and condensation of the starting acids and starting alcohols, in a single-stage or two-stage regime. The polyester units are synthesised preferably by way of a melt condensation. For this purpose, the dicarboxylic or polycarboxylic acids and diols or polyols used are reacted. The polycondensation takes place in the melt at temperatures between 130 and 280° C. over the course of 3 to 30 hours. A large part of the amount of water liberated during this procedure is firstly distilled off under atmospheric pressure. In the further course of the reaction, the remaining water and also volatile diols or polyols are eliminated until the target molecular weight or the desired acid number has been reached. This may be facilitated, optionally, by reduced pressure or by the passage of an inert gas stream through the reaction mixture. The reaction may additionally be accelerated by addition of an azeotrope former and/or of a catalyst, before or during the reaction. Examples of suitable azeotrope formers are toluene and xylene. Typical catalysts are organotitanium or organotin compounds such as tetrabutyl titanate or dibutyltin oxide. Also conceivable are catalysts based on other metals such as zinc, for example, examples being zinc acetate, or on antimony or zirconium, an example being zirconium isopropoxide, and also metal-free esterification catalysts such as, for example, toluenesulphonic acid, or a strong organic acid, such as haloacetic acid, for example trifluoroacetic acid. Additionally possible are other additives and process auxiliaries such as antioxidants, radical stabilisers and colour stabilisers. The reaction takes place preferably in an inert gas atmosphere, as for example under nitrogen.

The polyesters prepared accordingly are then reacted further in a further step with dicarboxylic acids or their anhydrides to give acid-functional polyesters. These polyesters are termed P—COOH. Based on the OH groups, between 20% to 100%, preferably between 30% to 80%, more preferably 40% and 70%, are reacted with dicarboxylic acids or their anhydrides. Anhydrides are used preferably in the present step. Anhydrides used are, for example, anhydrides of phthalic acid (PAn), 1,2-cyclohexanedicarboxylic acid, succinic acid, maleic acid, methyltetrahydrophthalic acid, methylhexahydrophthalic acid (MHH-PhA), hexahydrophthalic acid, and/or trimellitic acid.

The polyesters of the invention have in particular an Mn of 700 to 10 000 g/mol, preferably between 900 to 4000 g/mol, and an Mw of 1500 to 40 000 g/mol, preferably between 2000 to 15 000 g/mol. In the context of the present invention, the molar masses are determined by means of size exclusion chromatography (SEC). For this purpose, three columns from Merck (PS 400, 250*7 mm, PS 40, 250*7 mm, and PS 1, 250*7 mm) with a particle size of 5 μm are combined in series. After calibration, 20 μl of the polyester solution in tetrahydrofuran (c(polyester)=20 mg/ml) are injected at 40° C. with a Rheodyne 7125 injector and analysed at a flow rate of 1 ml/min (Waters 510 HPLC pump) at 40° C. with degassed tetrahydrofuran as mobile phase and a differential refractometer at 40° C. (Waters model 410). Evaluation is made after calibration against polystyrene standards, which is carried out in the manner described above. Polystyrene standards (standard 1 Mp 377400, Mp 96000, Mp 20650, Mp 1300, Mp 162; standard 2 Mp 283300, Mp 50400, Mp 10850, Mp 2930, Mp 980; standard 3 Mp 218800, Mp 68900, Mp 10050, Mp 1940, Mp 580; Mp=molar mass at peak maximum) are commercially available, for example, from Merck or Polymer Laboratories.

Furthermore, the polyesters P have an OH number of 30 to 300 mg KOH/g, preferably of 50 to 200 mg KOH/g. For the purposes of the present invention, the OH numbers are determined according to DIN 53240-2. In the case of that method, the sample is reacted with acetic anhydride in the presence of 4-dimethylaminopyridine as catalyst, with the hydroxyl groups being acetylated. For each hydroxyl group, this produces one molecule of acetic acid, while the subsequent hydrolysis of the excess acetic anhydride yields two molecules of acetic acid. The consumption of acetic acid is determined by titrimetry from the difference between the main value and a blank value, which is to be carried out in parallel.

Furthermore, the polyesters P preferably have an acid number, determined to DIN EN ISO 2114, of less than 100 mg KOH/g, preferably between 10 and 80 mg KOH/g, more preferably between 20 and 60 mg KOH/g. The acid number (AN) is the amount of potassium hydroxide in mg that is necessary to neutralise the acids contained within one gram of substance. The sample for analysis is dissolved in dichloromethane and titrated with 0.1 N ethanolic potassium hydroxide solution against phenolphthalein.

A further constituent of the dispersing resins of the formula (I) is the group Z, which is a basic group or a radical which comprises a basic group. Group Z is, in particular, polyfunctional, meaning that more than one T-P group and/or T group may be attached to Z covalently or as a salt. In one preferred embodiment the group Z comprises polyallylamines or poly(C2-4-alkyleneimines), preferably poly(C2-4-alkyleneimines).

The poly(C2-4-alkyleneimine) is preferably a polyethyleneimine (PEI), which may be linear or branched. The species in question preferably comprises polyfunctional, cationic polyethyleneimines having a branched polymer structure. Their constitution is represented by the empirical formula $(CH_2—CH_2—NH)_n$— where $10<n<10^5$. These are generally clear to slightly turbid, colourless to yellowish liquids. Their viscosity is dependent on the molecular weight, concentration and degree of branching.

The poly(C2-4-alkyleneimine), particularly the preferred polyethyleneimine, preferably has an average molecular weight Mw of between 200 and 600 000 g/mol, more preferably between 400 and 100 000 g/mol, very preferably between 600 and 30 000 g/mol.

Preferred polyethyleneimines are available commercially, for example, under the Lupasol® name from BASF SE or the EPOMIN name from Nippon Shokubai.

Group T is a group which ends the polymerization. The group which ends the polymerization is in this context often also termed a stopper.

Suitable groups which end the polymerization are monocarboxylic acids, particular preference being given to monocarboxylic acids which are free from amino groups. Preferred monocarboxylic acids are C1-25 aliphatic monocarboxylic acids, which may be saturated or unsaturated and may be substituted by hydroxyl or C1-4-alkoxy groups or by halogen. Preferred aliphatic monocarboxylic acids contain 8 or more carbon atoms. If the aliphatic monocarboxylic acids are substituted, the substituents are preferably hydroxyl groups. Examples of particularly preferred monocarboxylic acids are glycolic, lactic, caproic, lauric, stearic, methoxyacetic, ricinoleic, 12-hydroxystearic, 12-hydroxydodecanoic, 5-hydroxydodecanoic, 5-hydroxydecanoic and 4-hydroxydecanoic acids. The aforementioned acids may be used either alone or as mixtures of different acids.

The activity of T as stoppers derives from their prevention of the build-up of a network, and the corresponding suppression of any gelling. The length of the polyester chain may be controlled through the presence of the group T as stopper, through use of monocarboxylic acids, for example, during the preparation process.

In one embodiment of the present invention the compounds described above for forming the group T, more particularly monocarboxylic acids, are added during the actual synthesis of the polyester units P. In these cases, the polyester units T-P have a composition made up of 25 to 80 wt % of dicarboxylic or polycarboxylic acids, 25 to 80 wt % of diols or polyols and 1 to 25 wt % of a group which ends the polymerization, more particularly a monocarboxylic acid, the sum total of the constituents making 100 wt %.

The group T which is bonded to the polyester P may differ from the group T which is bonded directly to Z. Accordingly, two different groups T may be used during the polyester preparation and during the reaction of groups T and the intermediates T-P with Z. Not to be ruled out is the use of different groups T during polyester preparation and the reaction thereof with Z.

The weight ratio of compounds of the group Z, particularly of the polyallylamines or poly(C2-4-alkyleneimines), to the polyester P (hereinafter also called T-P—COOH) may be varied within a wide range, depending on whether the dispersing resin of the invention is to be used subsequently for dispersing a particulate solid in a polar or a non-polar organic solvent. Advantageous results are obtained when using dispersing resins when the weight ratio of polyester P (T-P—COOH) to compounds of the group Z, more particularly polyallylamines or poly(C2-4-alkyleneimines), is between 30:1 and 1:1, preferably between 20:1 and 2:1 and more preferably between 15:1 and 4:1.

The group T during the preparation of the polyester P may likewise be an aliphatic or aromatic alcohol, T-OH; the group T which is connected directly to Z will always be a monocarboxylic acid. Examples of T-OH are isopropanol, isobutanol, tert-butanol, 2-ethylbutanol, 3-heptanol, octanol, decanol, dodecanol, 2-ethylhexanol, 3,5,5-trimethylhexanol, 3,7-dimethyloctanol, phenol, alkylphenol. Guerbet alcohols are also suitable, furthermore. Guerbet alcohols are primary alcohols which are branched in β position relative to the $CH_2OH$ group. Guerbet alcohols are known to the skilled person; many have long been available commercially. They are obtained by a reaction known as the Guerbet reaction, a dimerization reaction which has been known for more than 100 years. Suitable representatives of the Guerbet alcohols are the alcohols available commercially under the selling name Isofol (Condea GmbH).

Groups T and T-P are attached through the carboxylic acid groups of T or of the polyester P to Z. Preferred dispersing resins therefore derive from the condensation of an acidic group of the polyester (T-P—COOH, i.e. a P chain having a terminal carboxylic acid group) and of an acidic group of additional T on Z. The acidic group of the polyester may either be a carboxylic acid group of the polyester constituents or else an OH group of the polyester that has been subsequently reacted with a dicarboxylic acid and/or with an anhydride. The reaction sequence below shows the basic types of reaction.

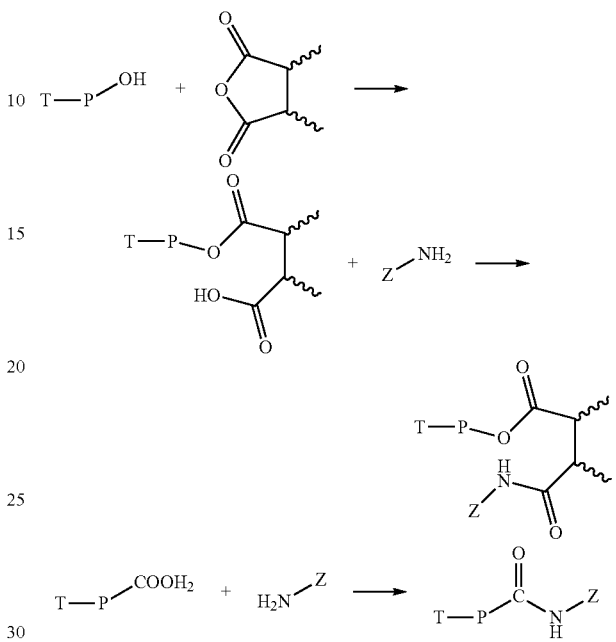

Z, T and P have the meaning as defined above.

In one preferred embodiment of the present invention the dispersing resin comprises a polyalkylamine or a poly(C2-4-alkyleneimine) as group Z, attached to which are at least two identical or different chains of the type T-P. Different chains of type T-P are attached to Z in order typically to optimise the compatibility in the coating systems and to allow a broad range of application of the dispersant in numerous formulation systems. Each polyester chain of the aforementioned type T-P is connected preferably to the polyallylamine or poly(C2-4-alkyleneimine) either through a covalent amide bond between a terminal carboxyl group of the polyester unit P and the nitrogen atom of a primary or secondary amino group of the polyallylamine or poly(C2-4-alkyleneimine), or through an ionic salt bond of a carboxylate group of the polyester unit P and a positively charged nitrogen atom of a substituted ammonium group of the polyallylamine or poly(C2-4-alkyleneimine). Since in the preferred embodiment the dispersing resin comprises at least two polyester chains of type T-P, there may be a mixture of amide bonds and salt bonds for the respective polyester chains, depending on the stringency of the reaction conditions for the amidation used when preparing the dispersing resin in order to link the polyester chains to the group Z. This preferred dispersing resin may be represented in simplified form by the formula (II),

(II)

where

X-*-*-X is a polyallylamine or poly(C2-4-alkyleneimine),

Y is a T-P polyester chain which is connected to the polyallylamine or poly(C2-4-alkyleneimine) through an amide or salt bond, with T and P being as defined above and q being from 2 to 2000.

Preferably q is more than 2 and more preferably it is not less than 5. It is also preferred, furthermore, if q is not greater than 1000 and preferably is not greater than 500.

It is further preferred for the weight ratio of the unit Y in formula (II) to the polyallylamine or poly(C2-4-alkyleneimine), which is represented in formula (II) by X-*-*-X, to be between 30:1 and 1:1, very preferably between 20:1 and 2:1, and especially preferably between 15:1 and 4:1.

Dispersing resins according to the present invention may be prepared by reaction of the corresponding constituents T, P or T-P and Z. A further subject of the present invention, accordingly, are processes for preparing the dispersing resins of the invention, comprising a first step of condensing dicarboxylic or polycarboxylic acids and diols or polyols in the presence of groups which end the polymerization, a second step of reacting the polyesters obtained in the first step with dicarboxylic acids or their anhydrides to form acid-functional polyesters, and a third step of subsequently reacting the acid-functional polyesters obtained in the second step with compounds of the group Z. In the third step, additionally, groups T which end the polymerization are preferably likewise present.

In the case of the preferred embodiment of the present invention, in accordance with formula (II), the preparation takes place by reaction of polyallylamine or a poly(C2-4-alkyleneimine), more particularly polyethyleneimine, with an acid-functional polyester unit P, to which the group T is bonded, and optionally additional T may be added. In one preferred embodiment, additional T is added in the reaction described above.

For example, the dispersing resin may be derived from polyallylamine or poly(C2-4-alkyleneimine) which has at least two primary, secondary or tertiary amino groups and from an intermediate T-P—COOH, where the carboxyl group of the intermediate T-P—COOH is a carboxyl group of the polyester unit P. The amino groups of the polyallylamine or of the poly(C2-4-alkyleneimine) and the carboxyl group of the polyester P may form an amide or salt bond. If the poly(C2-4-alkyleneimine) contains only tertiary amino groups, only salt bonds can be formed; otherwise, salt or amide bonds are formed depending on the reaction conditions. Generally speaking, mild reaction conditions such as low temperatures and/or short reaction times support the formation of salt bonds, and more stringent reaction conditions such as high temperature and/or long reaction times support the formation of amide bonds. These circumstances are known to the skilled person.

The reaction of the polyallylamines or poly(C2-4-alkyleneimines) with the intermediates T-P—COOH to give the dispersing resins of the invention in the third step of process of the invention takes place at a temperature of between 50 and 250° C., preferably under an inert atmosphere and optionally in the presence of an esterification catalyst. The temperature is preferably not less than 80° C. and more preferably not less than 100° C. In order to minimise carbonisation of the dispersing resin under formation, the temperature is preferably not more than 200° C. and more preferably not more than 180° C. A suitable inert gas is in principle any gas which does not react with the end product or with the starting materials, examples being noble gases or nitrogen, with nitrogen being used with preference.

It is preferable for the acid-functional polyesters to be prepared separately prior to the reaction with the polyallylamine or poly(C2-4-alkyleneimine). In this case, the dicarboxylic or polycarboxylic acids are reacted with the diols or polyols and with the monocarboxylic acids preferably employed as stoppers T under an inert atmosphere at 150 to 250° C., optionally in the presence of an esterification catalyst, and the polyesters obtained are then reacted with dicarboxylic acids or their anhydrides to give acid-functional polyesters. The subsequent reaction of the resulting polyesters of type T-P—COOH with polyallylamine or poly(C2-4-alkyleneimine) may then be carried out at temperatures of 50 to 250° C., preferably at 100 to 180° C., preferably in the presence of T.

If the dispersing resin obtained by the mode of preparation above comprises free amino groups, they may be converted into substituted ammonium groups by reaction with an acid or with a quaternizing agent, meaning that the dispersing resin is in the form of a substituted ammonium salt. Suitable reagents for this purpose are mineral acids and strong organic acids or acidic salts, such as acetic acid, sulphuric acid, hydrochloric acid, alkylsulphonic acid, alkyl hydrogensulphates and arylsulphonic acids, for example, including acidic forms of dyes and pigments, and quaternizing agents, such as dialkyl sulphates, for example dimethyl sulphate (DMS), and haloalkanes, such as methyl and ethyl chloride.

A further subject of the present invention are compositions comprising a dispersing resin of the invention. The compositions of the present invention comprise in particular a dispersing resin of the invention and a particulate solid. In another embodiment of the present invention, the composition preferably comprises a dispersion composed of a dispersing resin of the formula (I), a particulate solid and an organic medium.

The particulate solid which is present in the composition according to the present invention may comprise any organic or inorganic solid material. More particularly the particulate solid is substantially insoluble in the organic medium and is stabilised therein in a finely divided form by the dispersing resin.

Examples of suitable solids are dyes, pigments, fillers and other solid auxiliaries and adjuvants. Examples of particularly suitable finely divided solids are, in particular, pigments for dissolved inks, pigments, extenders and filler materials for paints and plastics, dyes, more particularly finely divided dyes, optical brighteners and adjuvants for textiles, for liquid dyebaths, liquid inks and other liquid application systems, for example, solids for oil-based drilling muds and invert emulsions, contaminants and particulate solids in liquids for dry cleaning, particulate ceramic materials, magnetic materials and substances for magnetic recording, and also biocides, agrochemicals and pharmaceuticals which are used as dispersions in organic media.

Finely divided solids used with preference are pigments from one of the recognised classes of pigments, which are described in, for example, the third edition of the Colour Index (1971) and in subsequent revisions thereof and supplements thereto, in the section titled 'Pigments'. Examples of inorganic pigments are titanium dioxide, zinc oxide, Prussian blue, cadmium sulphide, iron oxides, vermilion, ultramarine and the chromium pigments, including chromates, molybdates and mixed chromates and sulphates of lead, zinc, barium, calcium and mixtures and modifications thereof which are available commercially as greenish yellow to red pigments under the names Primrose, Lemon, Middle, Orange, Scarlet and Red chromes. Examples of organic pigments are selected in particular from the azo, diazo, condensed azo, thioindigo, indanthrone, isoindanthrone, anthanthrone, anthraquinone, isodibenzanthrone, triphenodioxazine, quinacridone and phthalocyanine series, more particularly copper phthalocyanine and its ring-halogenated derivatives, and also lakes of acidic, basic and mordant dyes. In terms of its dispersion properties, carbon black, despite being strictly inorganic, behaves more like an organic pigment. Preferred organic pigments are phthalocyanines, preferably copper phthalocyanines, monoazo, diazo, indanthrone, anthanthrone, quinacridone dyes, and carbon blacks.

Other preferred finely divided solids are extenders and fillers, such as, for example, talc, kaolin, silicon dioxide, barites and lime, particulate ceramic material, such as aluminium oxide, silicon dioxide, zirconium dioxide, titanium dioxide, silicon nitride, boron nitride, silicon carbide, boron carbide, mixed silicon aluminium nitrides and metal titanates, especially magnetic substances, such as the magnetic oxides of the transition metals, preferably iron and chromium, e.g. gamma-$Fe_2O_3$, $Fe_3O_4$, and cobalt-doped iron oxides, calcium oxide, ferrites, preferably barium ferrites, and metal particles, preferably metallic iron, nickel, cobalt and alloys thereof, and additionally agrochemicals, such as the fungicides flutriafen, carbendazim, chlorothalonil and mancozeb.

The organic medium which is present preferably in a composition of the present invention preferably comprises a polar organic medium or a non-polar aromatic hydrocarbon or halogenated hydrocarbon. The term "polar" in relation to the organic medium refers to an organic liquid or resin which is capable of forming moderate to strong bonds, as described in the article titled "A Three Dimensional Approach to Solubility" by Crowley et al. in Journal of Paint Technology, volume 38, 1966 on page 269. Organic media of these kinds generally have a hydrogen bond count of five or more, as defined in the article referred to above.

Examples of suitable polar organic media are amines, ethers, preferably lower alkyl ethers, organic acids, esters, ketones, glycols, alcohols and amides. Numerous examples of such liquids with moderately strong hydrogen bonds are reported in the book titled "Compatibility and Solubility" by Ibert Mellan (1968 publication by Noyes Development Corporation) in Table 2.14 on pages 39-40. The liquids stated in the publication all fall within the range of the term for a polar organic medium, and are therefore part of the present disclosure.

Preferred polar organic liquids are dialkyl ketones, alkyl esters of alkanecarboxylic acids and alkanols, glycols and glycol esters and ethers, alkanols, and cyclic ethers, preferably those liquids which contain up to and including six carbons. Particularly preferred organic media are dialkyl and cycloalkyl ketones, such as acetone, methyl ethyl ketone, diethyl ketone, diisopropyl ketone, methyl isobutyl ketone, diisobutyl ketone, methyl isoamyl ketone, methyl n-amyl ketone and cyclohexanone, alkyl esters such as methyl acetate, ethyl acetate, isopropyl acetate, butyl acetate, ethyl formate, methyl propionate, methoxypropyl acetate and ethyl butyrate, glycols and glycol esters and ethers, such as ethylene glycol, 2-ethoxyethanol, 3-methoxypropyl propanol, 3-ethoxypropylpropanol, 2-butoxyethyl acetate, 3-methoxypropyl acetate, 3-ethoxypropyl acetate and 2-ethoxyethyl acetate, alkanols, such as methanol, ethanol, n-propanol, isopropanol, n-butanol and isobutanol, and dialkyl ethers and cyclic ethers, such as diethyl ether and tetrahydrofuran.

The substantially non-polar media which may be used either alone or as an admixture of the aforementioned polar organic media are aromatic hydrocarbons, such as toluene and xylene, and halogenated aliphatic and aromatic hydrocarbons, such as trichloroethylene, perchloroethylene and chlorobenzene.

Examples of suitable polar resins as medium for the dispersion form of the present invention are those film-forming resins which are suitable for the preparation of liquid ink, paints and chips for use in numerous applications such as paints and liquid inks. Examples of such resins include polyamides, such as Versamid™ from BASF SE, for example, or cellulose ethers, such as ethylcellulose and ethylhydroxyethylcellulose.

Examples of paint resins include short-oil alkyd/melamine-formaldehyde resins, polyester/melamine-formaldehyde resins, thermosetting acrylic/melamine-formaldehyde resins, long-oil alkyd resins, and multi-layer resins such as acrylic and urea/aldehyde resins.

The dispersion may if desired comprise other constituents, examples being resins (if they do not already constitute the organic medium), binders, liquefying agents (such as those described in GB-A-1508576 and GB-A-2108143), sedimentation-preventing agents, plasticising agents, levelling agents and preservatives.

The compositions of the present invention, especially the preferred dispersions, contain usually from 5 to 95 wt % of the finely divided solid, with the precise amount depending on the nature of the solid and on the relative density of the solid and of the organic medium. For example, a dispersion in which the solid is an organic substance, such as an organic pigment, contains preferably from 15 to 60 wt % of the solid, whereas a dispersion in which the solid is an inorganic substance, such as an inorganic pigment, filler agent or extender, contains preferably from 40 to 90 wt % of the finely divided solid, based on the total weight of the dispersion.

The composition of the invention, more particularly the dispersion of the invention, may be obtained by any of the customary methods for producing compositions and dispersions. The solid, the organic medium and the dispersing resin of the invention may generally be mixed in any desired order. The mixture in this case may be subjected to a mechanical method for reducing the size of the particles of the solid to a suitable size, for example by ball-milling, bead-milling, gravel-milling or plastics rolling. The solid, independently or in admixture with either the organic medium or the dispersing resin, may alternatively be treated in order to reduce its particle size, after which the other constituent or constituents of the composition may be added, and the mixture may be stirred in order to produce the composition, preferably the dispersion.

If the composition is needed in dry form, the liquid medium is preferably volatile, and so may easily be removed from the particulate solid by simple separating means, such as evaporation. It is nevertheless preferred for the dispersion to comprise the liquid medium.

If the dry composition consists essentially of the dispersing resin and the particulate solid, it preferably contains at least 0.2 wt %, more preferably at least 0.5 wt % and preferably at least 1.0 wt % of the dispersing resin of the invention, based on the weight of particulate solid. The dry composition preferably contains not more than 50 wt %, more preferably not more than 20 wt % and preferably not more than 10 wt % of the dispersing resin of the invention, based on the weight of the particulate solid.

As described above, the dispersing resins of the present invention are particularly suitable for producing millbase. In a further embodiment of the present invention, the particulate solid may be ground in the presence of a dispersing resin of the invention and a film-forming resin binder, optionally in the presence of an organic medium.

In accordance with a further aspect of the invention, therefore, a millbase is provided which comprises a particulate solid, dispersing resin according to the present invention, and a film-forming resin.

The millbase customarily comprises from 20 to 70 wt % of particulate solid in relation to the total weight of the millbase. The particulate solid amounts preferably to not less than 30 wt % and more preferably not less than 50 wt % of the millbase.

The amount of the resin in the millbase may fluctuate within a wide range, but is preferably not less than 10 wt % and more preferably not less than 20 wt % in relation to the total weight of the millbase.

The amount of the dispersing resin of the invention in the millbase is dependent on the amount of the particulate solid, but is preferably from 0.5 to 5 wt %, based on the millbase.

Dispersions and millbases which comprise the dispersing resins according to the present invention are suitable in particular for use in paints, preferably paints with high solids content, and in liquid inks, preferably liquid inks for flexographic printing, gravure inks and screenprinting inks. Furthermore, they are of advantageous suitability for use in non-aqueous ceramic techniques, particularly in belt coating, in spreading methods using a doctor blade, or in extrusion or injection moulding methods.

Within the stated applications, the dispersing resins of the present invention have advantages over the known dispersing resins, particularly those based on polyesters formed from hydroxycarboxylic acids or lactones. In particular, the dispersing resins of the invention have a greater solubility in organic media, such as solvents. Accordingly, they generally do not separate out or crystallise on storage at 4° C. for prolonged periods. If stored at low temperatures, separation may occur at −25° C. In these cases, however, the dispersing resins of the present invention are easily redissolved on heating to 4-10° C. Where the dispersing resins of the present invention are incorporated into paints and decorative inks, they bring about higher gloss levels and lower haze levels in the resultant paints and inks.

Even without further observations, it is assumed that a skilled person will be able to utilize the above description to its widest extent. The preferred embodiments and examples are therefore to be interpreted merely as a descriptive disclosure which is by no means limiting in any way whatsoever.

The present invention is elucidated in more detail below using examples. Alternative embodiments of the present invention are obtainable analogously.

EXAMPLES

In the examples below, all quantity figures, unless otherwise indicated, are based on parts by weight. Amine numbers, OH numbers and acid numbers are reported in mg KOH/g. The monomers used and the corresponding amounts of monomer used for the synthesis of the polyesters and of the dispersing resins of the invention are given in the following tables, and the characteristics (OH number, acid number and molecular weight) of the resulting polyesters or dispersing resins are reported.

Preparation of Intermediates

Example A) Polyesters P Prepared with Addition of Monocarboxylic Acids

The polyester intermediates P are prepared by polyester preparation processes known to the skilled person. For this purpose, first of all, a condensation is carried out in a glass reaction vessel with a mechanical stirrer, a thermometer and a reflux condenser, under an inert gas atmosphere and at between 140 and 160° C., and then the reaction temperature is raised slowly to 200 to 230° C. to reach an acid number of less than 5.

Table 1 shows the composition and the properties of the polyesters P prepared.

Example B) Polyesters P Prepared with Addition of Monoalcohols

The polyester intermediates P are prepared by polyester preparation processes known to the skilled person. For this purpose, first of all, a condensation is carried out in a glass reaction vessel with a mechanical stirrer, a thermometer and a reflux condenser, under an inert gas atmosphere and at between 140 and 160° C., and then the reaction temperature is raised slowly to 200 to 230° C. to reach an acid number of less than 5.

Table 2 shows the composition and the properties of the polyesters P prepared.

TABLE 1

| Polyester designation | Lauric acid Amount [g] | Adipic acid Amount [g] | 1,6-Hexanediol Amount [g] | 1,5-Pentanediol Amount [g] | Neopentyl glycol Amount [g] | Acid number | OH number | Molecular weight [g/mol] |
|---|---|---|---|---|---|---|---|---|
| P-OH_1 | 7.4 | 43.0 | 49.6 | | | 4.0 | 140.0 | 1343 |
| P-OH_2 | 7.1 | 45.2 | 47.7 | | | 4.2 | 101.9 | 1746 |
| P-OH_3 | 7.6 | 44.5 | 21.2 | 26.6 | | 4.1 | 145.5 | 1291 |
| P-OH_4 | 7.3 | 46.8 | 20.3 | 25.6 | | 4.3 | 105.8 | 1682 |
| P-OH_5 | 14.6 | 42.6 | | | 42.9 | 4.2 | 111.6 | 1385 |
| P-OH_6 | 13.8 | 45.4 | | | 40.7 | 4.6 | 62.9 | 2012 |
| P-OH_7 | 14.3 | 41.7 | 16.8 | | 27.2 | 4.1 | 109.0 | 1417 |
| P-OH_8 | 13.6 | 44.6 | 16.0 | | 25.8 | 4.3 | 61.5 | 2056 |
| P-OH_9 | 7.6 | 44.5 | 21.2 | 16.7 | 9.9 | 4.1 | 145.2 | 1291 |
| P-OH_10 | 7.3 | 46.8 | 20.3 | 16.0 | 9.5 | 4.3 | 105.6 | 1682 |

TABLE 2

| Polyester designation | Dodecanol Amount [g] | Adipic acid Amount [g] | 1,6-Hexanediol Amount [g] | 1,5-Pentanediol Amount [g] | Neopentyl glycol Amount [g] | Acid number | OH number | Molecular weight [g/mol] |
|---|---|---|---|---|---|---|---|---|
| P-OH_11 | 6.6 | 45.4 | 48.0 | | | 3.9 | 146.4 | 1299 |
| P-OH_12 | 6.2 | 48.8 | 45.0 | | | 4.3 | 86.1 | 2010 |
| P-OH_13 | 7.1 | 44.8 | 21.3 | 26.8 | | 3.9 | 193.4 | 1297 |
| P-OH_14 | 6.7 | 48.2 | 20.0 | 25.1 | | 4.2 | 130.3 | 2011 |
| P-OH_15 | 13.7 | 43.0 | | | 43.3 | 3.7 | 203.0 | 1398 |
| P-OH_16 | 13.0 | 45.9 | | | 41.1 | 4.0 | 150.5 | 2035 |
| P-OH_17 | 13.7 | 40.9 | 17.4 | | 28.0 | 3.5 | 220.2 | 1263 |
| P-OH_18 | 12.9 | 44.5 | 16.3 | | 26.3 | 3.8 | 157.1 | 1912 |
| P-OH_19 | 7.3 | 43.2 | 21.9 | 17.3 | 10.3 | 3.7 | 222.5 | 1114 |
| P-OH_20 | 6.8 | 47.7 | 20.2 | 15.9 | 9.4 | 4.2 | 139.0 | 1871 |

Example 1: Preparation of Dispersing Resins with Polyesters as Per Example A) with Addition of Methylhexahydrophthalic Anhydride (MHH-PAn)

The above-described polyester intermediates as per Example A) are mixed in order with anhydride (MHH-PAn), fatty acid (lauric acid) and polyethyleneimine (Lupasol® PR 8515 from BASF SE) and reacted at about 130-150° C. to an acid number of less than 50, with water liberated being removed by distillation. After the reaction, yellow to brown products, which are viscous or even highly viscous, but not crosslinked, are formed, and can be used as dispersing resins.

Table 3 shows the composition and the properties of the dispersing resins prepared.

Example 2: Preparation of Dispersing Resins with Polyesters as Per Example A) with Addition of Phthalic Anhydride (PAn)

The above-described polyester intermediates as per Example A) are mixed in order with anhydride (PAn), fatty acid (lauric acid) and polyethyleneimine (Lupasol® PR 8515 from BASF SE) and reacted at about 130-150° C. to an acid number of less than 50, with water liberated being removed by distillation. After the reaction, yellow to brown products, which are viscous or even highly viscous, but not crosslinked, are formed, and can be used as dispersing resins.

Table 4 shows the composition and the properties of the dispersing resins prepared.

TABLE 3

| T-P-Z-T designation | P-OH amount [g] | P-OH type | MHH-PAn amount [g] | Lauric acid Amount [g] | Lupasol® PR8515 amount [g] | Amine number | Acid number | OH number |
|---|---|---|---|---|---|---|---|---|
| T-P-Z-T_1 | 100.0 | P-OH_1 | 20.8 | 33.3 | 20.5 | 78.3 | 35.4 | 109.5 |
| T-P-Z-T_2 | 100.0 | P-OH_2 | 15.2 | 24.2 | 14.9 | 64.5 | 29.4 | 94.6 |
| T-P-Z-T_3 | 100.0 | P-OH_3 | 21.7 | 34.6 | 21.3 | 80.0 | 36.2 | 111.2 |
| T-P-Z-T_4 | 100.0 | P-OH_4 | 15.7 | 25.1 | 15.5 | 66.0 | 30.2 | 96.4 |
| T-P-Z-T_5 | 100.0 | P-OH_5 | 16.6 | 26.5 | 16.3 | 68.3 | 31.1 | 99.0 |
| T-P-Z-T_6 | 100.0 | P-OH_6 | 9.4 | 14.9 | 9.2 | 46.0 | 21.5 | 71.1 |
| T-P-Z-T_7 | 100.0 | P-OH_7 | 16.2 | 25.9 | 15.9 | 67.3 | 30.7 | 97.9 |
| T-P-Z-T_8 | 100.0 | P-OH_8 | 9.2 | 14.6 | 9.0 | 45.2 | 21.1 | 70.0 |
| T-P-Z-T_9 | 100.0 | P-OH_9 | 21.6 | 34.5 | 21.2 | 79.9 | 36.1 | 111.1 |
| T-P-Z-T_10 | 100.0 | P-OH_10 | 15.7 | 25.1 | 15.4 | 66.0 | 30.1 | 96.4 |

TABLE 4

| T-P-Z-T designation | P-OH amount [g] | P-OH type | PAn amount [g] | Lauric acid Amount [g] | Lupasol® PR8515 amount [g] | Amine number | Acid number | OH number |
|---|---|---|---|---|---|---|---|---|
| T-P-Z-T_11 | 100.0 | P-OH_1 | 18.5 | 41.6 | 23.6 | 68.7 | 43.9 | 119.0 |
| T-P-Z-T_12 | 100.0 | P-OH_2 | 13.4 | 30.3 | 17.2 | 57.1 | 36.8 | 103.3 |
| T-P-Z-T_13 | 100.0 | P-OH_3 | 19.2 | 43.2 | 24.5 | 70.1 | 44.8 | 120.8 |
| T-P-Z-T_14 | 100.0 | P-OH_4 | 13.9 | 31.4 | 17.8 | 58.4 | 37.6 | 105.2 |
| T-P-Z-T_15 | 100.0 | P-OH_5 | 14.7 | 33.1 | 18.8 | 60.3 | 38.8 | 107.9 |
| T-P-Z-T_16 | 100.0 | P-OH_6 | 8.3 | 18.7 | 10.6 | 41.2 | 27.1 | 78.1 |
| T-P-Z-T_17 | 100.0 | P-OH_7 | 14.4 | 32.4 | 18.4 | 59.5 | 38.2 | 106.8 |
| T-P-Z-T_18 | 100.0 | P-OH_8 | 8.1 | 18.3 | 10.4 | 40.5 | 26.6 | 77.0 |
| T-P-Z-T_19 | 100.0 | P-OH_9 | 19.2 | 43.1 | 24.5 | 70.1 | 44.8 | 120.7 |
| T-P-Z-T_20 | 100.0 | P-OH_10 | 13.9 | 31.4 | 17.8 | 58.3 | 37.6 | 105.1 |

Example 3: Preparation of Dispersing Resins with Polyesters as Per Example A) with Addition of Methylhexahydrophthalic Anhydride (MHH-PAn)

The above-described polyester intermediates as per Example A) are mixed in order with anhydride (MHH-PAn), fatty acid (ricinoleic acid) and polyethyleneimine (Lupasol® PR 8515 from BASF SE) and reacted at about 130-150° C. to an acid number of less than 50, with water liberated being removed by distillation. After the reaction, yellow to brown products, which are viscous or even highly viscous, but not crosslinked, are formed, and can be used as dispersing resins.

Table 5 shows the composition and the properties of the dispersing resins prepared.

TABLE 5

| T-P-Z-T designation | P-OH amount [g] | P-OH type | MHH-PAn amount [g] | Ricinoleic acid Amount [g] | Lupasol® PR8515 amount [g] | Amine number | Acid number | OH number |
|---|---|---|---|---|---|---|---|---|
| T-P-Z-T_41 | 100.0 | P-OH_1 | 18.5 | 62.0 | 18.0 | 60.7 | 47.6 | 98.2 |
| T-P-Z-T_42 | 100.0 | P-OH_2 | 13.4 | 45.2 | 13.1 | 51.1 | 40.3 | 86.3 |
| T-P-Z-T_43 | 100.0 | P-OH_3 | 19.2 | 64.5 | 18.8 | 61.9 | 48.6 | 99.5 |
| T-P-Z-T_44 | 100.0 | P-OH_4 | 13.9 | 46.9 | 13.6 | 52.2 | 41.2 | 87.8 |
| T-P-Z-T_45 | 100.0 | P-OH_5 | 14.7 | 49.4 | 14.4 | 53.8 | 42.4 | 89.9 |
| T-P-Z-T_46 | 100.0 | P-OH_6 | 8.3 | 27.9 | 8.1 | 37.5 | 30.1 | 66.4 |
| T-P-Z-T_47 | 100.0 | P-OH_7 | 14.4 | 48.3 | 14.1 | 53.1 | 41.9 | 89.0 |
| T-P-Z-T_48 | 100.0 | P-OH_8 | 8.1 | 27.3 | 7.9 | 37.0 | 29.6 | 65.5 |
| T-P-Z-T_49 | 100.0 | P-OH_9 | 19.2 | 64.4 | 18.7 | 61.8 | 48.5 | 99.4 |
| T-P-Z-T_50 | 100.0 | P-OH_10 | 13.9 | 46.8 | 13.6 | 52.2 | 41.2 | 87.7 |

Example 4: Preparation of Dispersing Resins with Polyesters as Per Example B) with Addition of Methylhexahydrophthalic Anhydride (MHH-PAn)

The above-described polyester intermediates as per Example B) are mixed in order with anhydride (MHH-PAn), fatty acid (lauric acid) and polyethyleneimine (Lupasol® PR 8515 from BASF SE) and reacted at about 130-150° C. to an acid number of less than 50, with water liberated being removed by distillation. After the reaction, yellow to brown products, which are viscous or even highly viscous, but not crosslinked, are formed, and can be used as dispersing resins.

Table 6 shows the composition and the properties of the dispersing resins prepared.

Example 5: Preparation of Dispersing Resins with Polyesters as Per Example B) with Addition of Phthalic Anhydride (PAn)

The above-described polyester intermediates as per Example B) are mixed in order with anhydride (PAn), fatty acid (lauric acid) and polyethyleneimine (Lupasol® PR 8515 from BASF SE) and reacted at about 130-150° C. to an acid number of less than 50, with water liberated being removed by distillation. After the reaction, yellow to brown products, which are viscous or even highly viscous, but not crosslinked, are formed, and can be used as dispersing resins.

Table 7 shows the composition and the properties of the dispersing resins prepared.

TABLE 6

| T-P-Z-T designation | P-OH amount [g] | P-OH type | MHH-PAn amount [g] | Lauric acid Amount [g] | Lupasol® PR8515 amount [g] | Amine number | Acid number | OH number |
|---|---|---|---|---|---|---|---|---|
| T-P-Z-T_21 | 100.0 | P-OH_11 | 21.8 | 52.2 | 21.4 | 73.2 | 42.9 | 101.5 |
| T-P-Z-T_22 | 100.0 | P-OH_12 | 12.8 | 30.7 | 12.6 | 53.8 | 32.8 | 80.7 |
| T-P-Z-T_23 | 100.0 | P-OH_13 | 28.8 | 68.9 | 28.3 | 83.5 | 48.1 | 109.7 |
| T-P-Z-T_24 | 100.0 | P-OH_14 | 19.4 | 46.4 | 19.0 | 68.8 | 40.8 | 97.4 |
| T-P-Z-T_25 | 100.0 | P-OH_15 | 30.2 | 72.4 | 29.7 | 85.3 | 48.9 | 110.8 |
| T-P-Z-T_26 | 100.0 | P-OH_16 | 22.4 | 53.6 | 22.0 | 74.2 | 43.5 | 102.4 |
| T-P-Z-T_27 | 100.0 | P-OH_17 | 32.8 | 78.5 | 32.2 | 88.3 | 50.2 | 112.4 |
| T-P-Z-T_28 | 100.0 | P-OH_18 | 23.4 | 56.0 | 23.0 | 75.8 | 44.3 | 103.8 |

TABLE 6-continued

| T-P-Z-T designation | P-OH amount [g] | P-OH type | MHH-PAn amount [g] | Lauric acid Amount [g] | Lupasol ® PR8515 amount [g] | Amine number | Acid number | OH number |
|---|---|---|---|---|---|---|---|---|
| T-P-Z-T_29 | 100.0 | P-OH_19 | 33.1 | 79.3 | 32.5 | 88.7 | 50.4 | 112.6 |
| T-P-Z-T_30 | 100.0 | P-OH_20 | 20.7 | 49.5 | 20.3 | 71.2 | 42.0 | 99.7 |

TABLE 7

| T-P-Z-T designation | P-OH amount [g] | P-OH type | PAn amount [g] | Lauric acid Amount [g] | Lupasol ® PR8515 amount [g] | Amine number | Acid number | OH number |
|---|---|---|---|---|---|---|---|---|
| T-P-Z-T_31 | 100.0 | P-OH_11 | 19.3 | 43.5 | 18.9 | 69.4 | 41.1 | 111.4 |
| T-P-Z-T_32 | 100.0 | P-OH_12 | 11.4 | 25.6 | 11.1 | 50.1 | 30.9 | 86.2 |
| T-P-Z-T_33 | 100.0 | P-OH_13 | 25.5 | 57.4 | 24.9 | 80.1 | 46.4 | 122.3 |
| T-P-Z-T_34 | 100.0 | P-OH_14 | 17.2 | 38.7 | 16.8 | 65.0 | 38.9 | 106.2 |
| T-P-Z-T_35 | 100.0 | P-OH_15 | 26.8 | 60.3 | 26.2 | 82.0 | 47.3 | 123.9 |
| T-P-Z-T_36 | 100.0 | P-OH_16 | 19.8 | 44.7 | 19.4 | 70.5 | 41.6 | 112.6 |
| T-P-Z-T_37 | 100.0 | P-OH_17 | 29.0 | 65.4 | 28.4 | 85.1 | 48.7 | 126.4 |
| T-P-Z-T_38 | 100.0 | P-OH_18 | 20.7 | 46.7 | 20.3 | 72.1 | 42.5 | 114.4 |
| T-P-Z-T_39 | 100.0 | P-OH_19 | 29.3 | 66.1 | 28.7 | 85.5 | 49.0 | 126.6 |
| T-P-Z-T_40 | 100.0 | P-OH_20 | 18.3 | 41.3 | 17.9 | 67.4 | 40.1 | 109.2 |

The invention claimed is:

1. A dispersing resin of the general formula (I),

T-P-Z-T    (I)

or salts thereof,
wherein
T is a monocarboxylic acid,
Z comprises at least one of a polyallylamine and a poly(C2-4-alkyleneimine),
P is a polyester obtained by a process comprising reacting a dicarboxylic or a polycarboxylic acid and a diol or a polyol.

2. The dispersing resin according to claim 1, wherein the dicarboxylic or the polycarboxylic acid are at least one selected from the group consisting of phthalic acid, isophthalic acid, terephthalic acid, 1,2-cyclohexanedicarboxylic acid and isomers, succinic acid, sebacic acid, methyltetrahydrophthalic acid, methylhexahydrophthalic acid, hexahydrophthalic acid, tetrahydrophthalic acid, dodecanedioic acid, adipic acid, glutaric acid, citraconic acid, fumaric acid, itaconic acid, maleic acid, mesaconic acid, azelaic acid, pyromellitic acid, trimellitic acid, and acid anhydride and/or low molecular mass alkyl ester derivatives thereof.

3. The dispersing resin according to claim 1, wherein the diol or the polyol is at least one selected from the group consisting of ethylene glycol, 1,2-propanediol, 1,3-propanediol, diethylene glycol, dipropylene glycol, triethylene glycol, tetraethylene glycol, 1,2-butanediol, 1,4-butanediol, 1,3-butylethylpropanediol, 1,3-methylpropanediol, 1,5-pentanediol, cyclohexanedimethanol, Dicidol, glycerol, 1,6-hexanediol, neopentyl glycol, bisphenol A, bisphenol B, bisphenol C, bisphenol F, norbornylene glycol, 1,4-benzyldimethanol, 1,4-benzyldiethanol, and 2,4-dimethyl-2-ethylhexane-1,3-diol.

4. The dispersing resin according to claim 1, wherein the polyester P has an Mn of 700 to 10000 g/mol and an Mw of 1500 to 40000 g/mol.

5. The dispersing resin according to claim 1, wherein the monocarboxylic acid of T is at least one C1-25 aliphatic monocarboxylic acid, which may be saturated or unsaturated and may be substituted by a hydroxyl group or a C1-4-alkoxy group or by a halogen group.

6. The dispersing resin according to claim 1, wherein the group Z is a polyethyleneimine that has an average molecular weight Mw of between 200 and 600 000 g/mol.

7. The dispersing resin according to claim 1, wherein the group Z is a polyethyleneimine having an average molecule weight Mw of between 200 and 600000 g/mol.

8. The dispersing resin according to claim 1, wherein the weight ratio of the polyester P to a compound of the group Z is between 30:1 and 1:1.

9. A process for preparing the dispersing resin according to claim 1, the process comprising
condensing the dicarboxylic or the polycarboxylic acid and the diol or the polyol in the presence of the groups which end the polymerization to obtain a polyester,
reacting the polyester with a dicarboxylic acid or its anhydride to obtain an acid-functional polyester,
subsequently reacting the acid-functional polyester with a compound of the group Z, and
ending polymerization with a monocarboxylic acid to form a T moiety in the dispersing resin.

10. The process according to claim 9, wherein the groups T which end the polymerization are additionally present during the reacting of the polyester with the dicarboxylic acid or its anhydride.

11. The process according to claim 9, wherein the reacting of the polyester with the dicarboxylic acid or its anhydride takes place at a temperature of between 50 and 250° C.

12. The process according to claim 9, wherein the weight ratio of the polyester P to a compound of the group Z in the dispersing resin is between 30:1 and 1:1.

13. A composition comprising the dispersing resin according to claim 1.

14. The composition according to claim 13, further comprising a particulate solid.

15. The composition according to claim 13, wherein the composition is a dispersion further comprising a particulate solid and an organic medium.

16. A method of facilitating dispersion of a solid in a liquid medium, the method comprising
adding the dispersing resin according to claim 1 as a dispersant for the solid in the liquid medium.

17. The process according to claim 9, wherein the weight ratio of the polyester P to a compound of the group Z in the dispersing resin is between 15:1 and 4:1.

18. The composition according to claim 14, wherein the particulate solid is at least one selected from the group consisting of dyes, pigments, fillers, optical brighteners, ceramic materials, magnetic materials, biocides, agrochemicals, and pharmaceuticals.

19. The composition according to claim 15, wherein the dispersion is a paint or an ink and wherein the dispersion has a higher gloss level, lower haze level, or both compared to a substantially similar paint or ink lacking the dispersing resin.

20. The composition according to claim 15, wherein the dispersing resin does not separate out or crystallize in the organic medium at a temperature of greater than −20° C.

* * * * *